April 18, 1950  C. H. THETFORD  2,504,467
TRUCK BODY
Filed Nov. 1, 1948  2 Sheets-Sheet 1
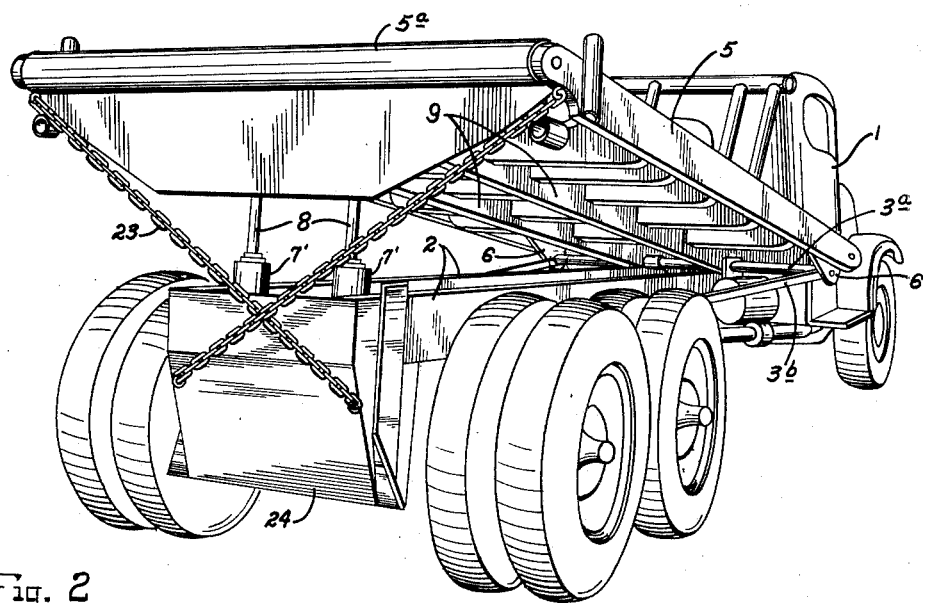
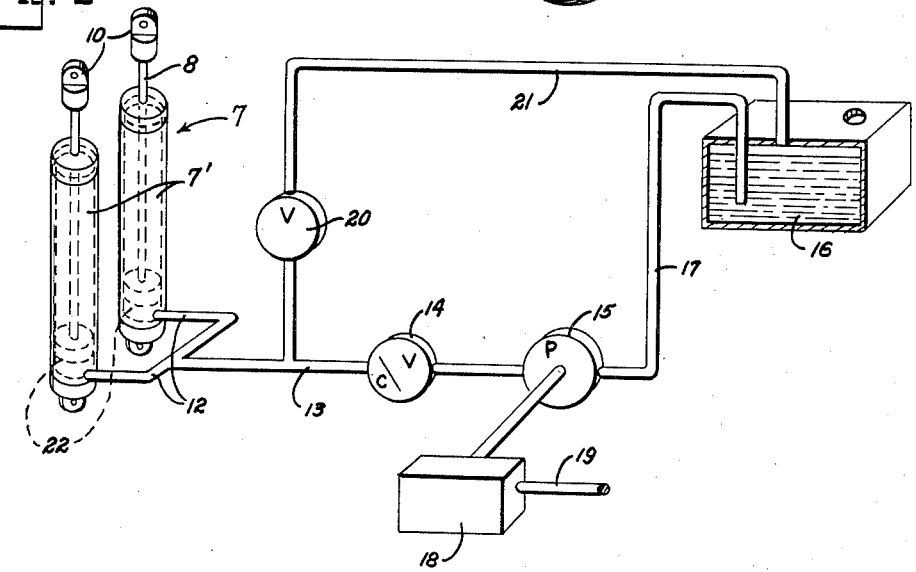
INVENTOR.
Charles H. Thetford
BY
Wayland D. Keith
HIS AGENT April 18, 1950     C. H. THETFORD     2,504,467
TRUCK BODY
Filed Nov. 1, 1948           2 Sheets-Sheet 2
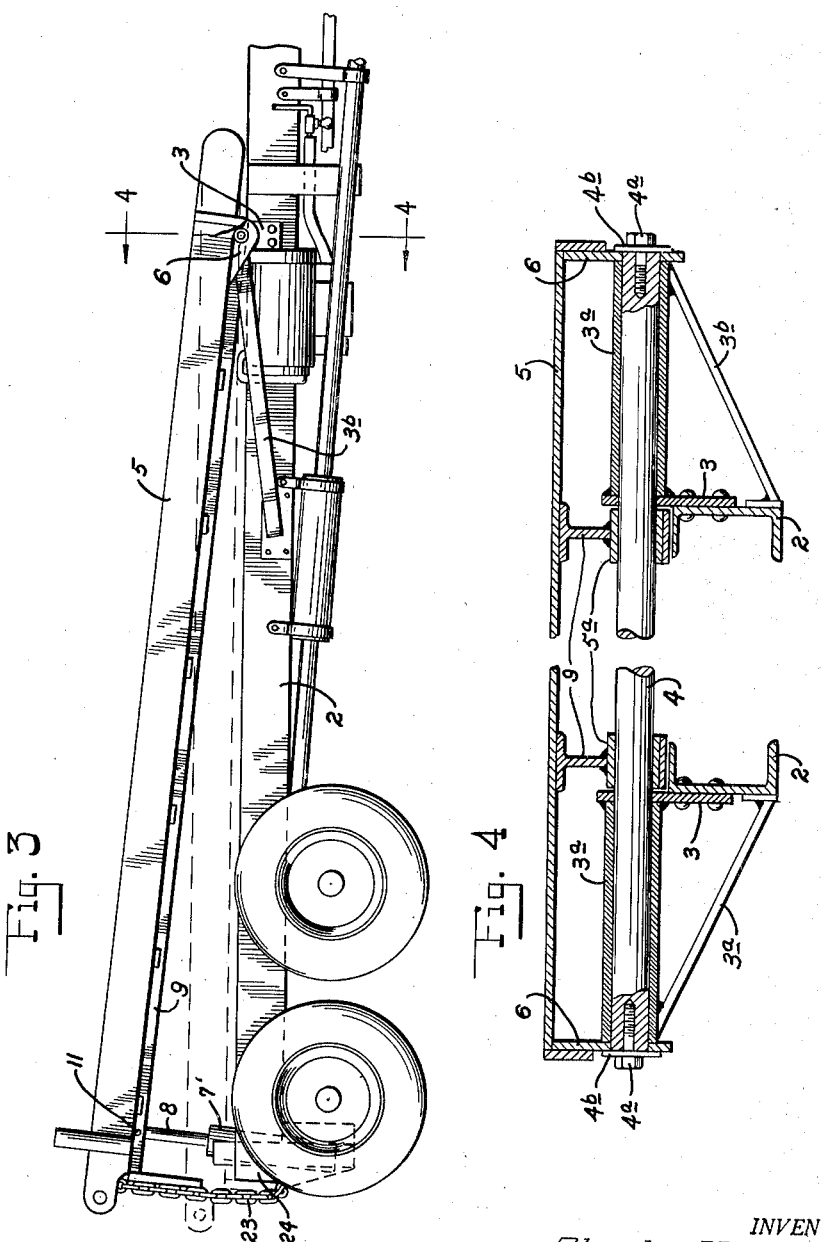
INVENTOR.
Charles H. Thetford
BY
Wayland D. Keith
HIS AGENT Patented Apr. 18, 1950

2,504,467

UNITED STATES PATENT OFFICE 2,504,467

TRUCK BODY

Charles H. Thetford, Graham, Tex.

Application November 1, 1948, Serial No. 57,707

5 Claims. (Cl. 214—65)

This invention relates to improvements in truck bodies and more particularly to truck bodies which may be raised to discharge a load at a higher level than the normal level of the truck body.

Truck bodies have been proposed heretofore, that were adapted to be elevated, but these in general, have been pivoted so that the front portion was elevated, as in dump trucks, so that the load was dumped rearward and below the normal level of the truck bed.

In the present invention, the truck is pivoted at the forward end thereof, and hydraulic means is provided at the rear end of the truck body for elevating the rear portion of the truck, which enables the loading and unloading of material or heavy equipment from the truck bed at a higher position than the normal level of the truck bed.

The primary object of this invention is to provide a truck body which may be elevated to be loaded or unloaded at a higher elevation than the normal level of the truck bed.

Another object of this invention is to provide means to prevent lateral movement of the truck body while it is in elevated position for loading and unloading.

Still another object of this invention is to provide a hydraulic system for elevating the rear end of the truck body.

An embodiment of this invention is illustrated in the accompanying drawings, in which:

Fig. 1 is a perspective view of the rear and side portions of a truck with the body thereof in raised position;

Fig. 2 is a perspective, diagrammatic view of the hydraulic system which elevates the truck body;

Fig. 3 is a side elevational view of the rear portion of the truck, showing the body thereof in raised position by full lines, and in transport position in dashed outline; and Fig. 4 is a sectional view taken on the line 4—4 of Fig. 3, looking in the direction indicated by the arrows, and with parts broken away and shortened to show the details of construction.

With more detailed reference to the drawing the numeral 1 designates a conventional motor truck having longitudinal frame members 2 which are spaced apart. The longitudinal frame members 2 each has a bracket 3 secured thereto, and to each of the brackets 3 an elongated, tubular sleeve 3a welded thereto and extending outwardly therefrom so as to form an elongated bearing. Braces 3b extend upwardly and forwardly of the frame members 2 and connect with the outer ends of the elongated tubular sleeves 3a for the support of these sleeves. A pivot shaft 4 is adapted to pass through both of the sleeves 3a and is adapted to extend the entire width of the body 5 and to pivot on lugs 6 at the outer sides of said body 5. The body 5 is preferably formed of structural members, such as I-beams 9 which extend substantially the length thereof, as shown in Figs. 1 and 4. The I-beams 9 have sleeves 5a welded thereto and journaled onto the shaft 4 so that the center portion of the truck body 5 will be supported.

The shaft 4 is free floating in sleeves 3a and 5a and in downwardly depending lugs 6. The shaft 4 is retained in place by a cap screw 4a which is screw threaded into engagement with each end of the shaft 4, and a washer 4b is positioned intermediate the head of cap screw 4a and the bracket 6 so as to retain the shaft in place.

The truck body 5 has lugs 6 depending from the front end thereof, one lug on each side of said truck body 5, and which lugs have holes therethrough. The holes in the brackets 3 and in sleeves 3a are adapted to register with the holes in the depending lugs 6 and to receive an axial shaft therethrough so as to form a hinge joint between the frame members 2 and the truck body 5. This hinge joint, which is at the front portion of the truck, will permit the rear end thereof to be elevated when pressure is applied to the under side thereof.

In order that the rear end of the truck body may be elevated, a hydraulic power device, such as is designated generally at 7, is provided. The hydraulic power device comprises a pair of hydraulic cylinders 7', which cylinders 7' are supported by the longitudinal truck frame members 2, in such position that the respective plungers 8 of the cylinders 7' will be extended upward to contact, in pivotal relation, the frame members 9 on the lower side of the truck body 5. The hydraulic power cylinders 7' each have a clevis connection with a pin 11 which passes through a hole in the clevis 10. The hydraulic power cylinders are connected in parallel by means of pipes 12, and to which pipes 12 a pipe 13 is connected, and which pipe 13 leads from a check valve 14 and a pump 15.

The pump 15 is supplied with hydraulic fluid from a reservoir 16 by means of a suction line 17. The power is supplied to the pump 15 through a gear box 18 driven from the motor of the truck. This power driven pump 15 is driven by a conventional power take-off shaft 19.

A control valve 20 is positioned within a pipe 21, and with the pump actuated and the control valve 20 open, hydraulic fluid is circulated through pipe 13, control valve 20 and pipe 21 back to the reservoir 16. When the control valve 20 is closed, hydraulic fluid is directed through check valve 14, pipe 13 and into pipes 12 to apply hydraulic power to pistons 22, one in each of the respective cylinders 7' for raising the truck body 5, as shown in Figs. 1 and 5.

A pair to stay chains 23 are provided, one connected to each side of the truck body 5 at one end, and at the opposite ends, the stay chains 23 are connected to depending portions 24 of frame members 2, so as to form an X when the chains are taut. The depending frame portions 24 also serve as a bumper for the truck frame, so that the truck can be used to push heavy objects.

The rear end of the truck body 5 may be provided with a roller 5a which is journaled at either side of the truck body, with the upper surface thereof at approximately truck bed level. This roller facilitates the moving of heavy objects and equipment onto and from the truck.

Operation

In unloading heavy objects from a truck onto various platforms or structures, which may vary in height from a few inches higher than the normal level of the truck bed to several feet higher, considerable work have been involved heretofore, in providing ramps, jacking means, winches and the like in order to unload the equipment and get it at the proper level, which is higher than the normal level of the truck bed. Or, if the reverse were to be accomplished, that is, a load at a high elevation, was to be lowered onto a truck bed, much extra work and equipment was necessarily involved.

With the present invention, the rear end of the truck bed can be elevated to the level of the load to be placed thereon, thus eliminating much hazardous work and the use of extra equipment. And, of course, the same applies to the unloading from the truck of equipment that must be placed at a higher level than the normal level of the truck bed, which can be illustrated by the unloading of heavy oil field equipment, such as drilling rigs, on to the foundation from which they are to operate, and which operating level is normally higher than the normal level of the truck bed.

With the power take-off shaft 19 engaged by conventional methods with the gears in gear box 18, the hydraulic pump 15 will be driven at the desired speed to withdraw the hydraulic fluid from the reservoir 16, through the line 17 to enable the hydraulic fluid to be discharged through check valve 14 and line 13, and with the control valve 20, which is normally open, in open position, the hydraulic fluid will circulate through the valve 20 and return through the pipe 21 to the reservoir 16, as the weight of the truck body is sufficient to prevent the lifting thereof unless the valve 20 is closed.

When it is desired to elevate the rear end of the truck body 5, the valve 20 may be closed any desired degree. This will permit part of the fluid to be by-passed, if so desired, but at the same time will allow some of the hydraulic fluid to be forced into the pipes 12 to apply hydraulic fluid pressure simultaneously to the pistons 22, which raise the respective plungers 8 therein, that are connected to the underside of frame members 9. This will exert hydraulic pressure against the under side of the truck body 5, and, due to the fact that the front end of the truck body 5 is pivoted to the frame, the rear end of the truck body 5 will be raised. The speed at which the truck is raised is controlled by the control valve 20, which will allow a small amount of pressure to be applied to the truck body, or the full amount thereof, according to the degree of opening of the control valve 20. The highest speed is obtained when the valve is completely closed, and the full capacity of the pump is exerted.

When the valve 20 is completely closed, the pump 15 directs the hydraulic fluid into line 13 and lines 12, and the full force of the hydraulic pressure will be delivered to the cylinders 7'. The plungers 8 will move upward until the truck body 5 attains the maximum elevation at the rear end. The maximum elevated position is determined by the restraining stay chains 23. The pump may be stopped, and the return of the fluid to reservoir 16 through lines 12 and 13, is prevented by the use of the check valve 14.

With the valve 20 closed, the fluid within the hydraulic cylinders 7' and lines 12 and the line 13 will be restrained against movement in any direction, until the valve 20 is opened, at which time the weight of the truck will force the plungers 8 downward to cause hydraulic fluid to be discharged from the cylinders 7' through lines 12, through line 13, valve 20 and valve 21 back to the reservoir 16.

The truck body 5 may be lowered any desired degree and maintained at the desired elevation by closing the valve 20, or the upward movement of the body 5 may be arrested at any point between the normal transport position and the maximum elevated position by stopping the hydraulic pump 15, or by the manipulation of the valve 20.

When the truck body 5 is raised to the proper elevation for loading or unloading, the material may be readily drawn onto the truck bed or removed therefrom in a conventional manner, such as by using a winch and winch line, jacks or other suitable power multiplying devices.

It is preferable to have the control of the valve 20 located within the cab of the truck within easy reach of the operator, as well as the controls for the power take-off by which the operator may operate the hydraulic pump.

The arrangement as described above provided for loading or unloading the truck at any desired level, from the normal transport position of the truck body, to the maximum elevated position.

Having thus described the invention, what is claimed is:

1. In combination with a motor vehicle having longitudinal frame members, said frame members being spaced apart, brackets having apertures therein secured to said frame members and upstanding therefrom tubular bearings outstanding from said brackets in alignment with the apertures therein, a platform mounted above said longitudinal frame members, apertured lugs secured to and depending from said platform tubular bearings secured to said lugs, all of said bearings and, the apertures in said depending lugs and in said upstanding brackets being adapted to register to receive therein an axial member to form a pivotal connection between said platform and said longitudinal frame members, and hydraulic power means positioned to produce cooperative relative movement of said platform with respect to said longitudinal frame members.

2. In combination with a motor vehicle having longitudinal frame members spaced apart, brackets having apertures therein secured to said longitudinal frame members and upstanding therefrom tubular bearings outstanding from said brackets in alignment with the apertures therein, brace means connecting said bearings and said frame members, a platform mounted on said longitudinal frame members, apertured lugs secured to and depending from said platform tubular bearings secured to said lugs, all of said bearings and, said apertures in said depending lugs and in said upstanding brackets being adapted to register to receive an axial member therein to form a pivotal connection between said platform and said longitudinal frame members, hydraulic power means positioned to produce relative cooperative movement of said platform with respect to said longitudinal frame members when in retracted position, and adapted to move said platform upward when in extended position.

3. In combination with a motor vehicle having longitudinal frame members spaced apart, brackets having apertures therein secured to said longitudinal frame members and upstanding therefrom, a platform supported solely on said vehicle and adapted to have its rear end positioned adjacent a loading structure at a higher level than said frame members, said platform being pivotally mounted at its lower end on said longitudinal frame members, apertured lugs secured to and depending from said platform, said apertures in said depending lugs and in said upstanding brackets being adapted to register and to receive therein an axial member to form a pivotal connection between said platform and said longitudinal frame members load engaging roller means supported adjacent the rear end of said platform, hydraulic power means positioned to produce cooperative relative movement of said platform with respect to said longitudinal frame members, and means for limiting the upward movement of said platform.

4. In combination with a motor vehicle having longitudinal frame members spaced apart, brackets having apertures therein secured to said longitudinal frame members and upstanding therefrom, a platform supported solely on said vehicle and adapted to have its rear end positioned adjacent a loading structure at a higher level than said frame members, said platform being pivotally mounted at its lower end on said longitudinal frame members, apertured lugs secured to and depending from said platform, said apertures in said depending lugs and in said upstanding brackets being adapted to register and to receive an axial member therein to form a pivotal connection between said platform and said longitudinal frame members load engaging roller means supported adjacent the rear end of said platform, said roller means being disposed with the load engaging surface thereof substantially tangent to the load supporting surface of said platform, hydraulic power means positioned to produce cooperative relative movement of said platform with respect to said longitudinal frame members, and means for limiting the upward movement of said platform comprising a pair of flexible members.

5. In combination with a motor vehicle having longitudinal frame members, said frame members being spaced apart, brackets having apertures therein secured on said frame members and upstanding therefrom, a platform mounted on said longitudinal frame members, apertured lugs secured to and depending from said platform, the said apertures in said depending lugs and in said upstanding brackets being adapted to register to receive therein an axial member to form a pivotal connection between said platform and said longitudinal frame members, hydraulic power means positioned to produce cooperating relative movement of said platform with respect to said longitudinal frame members, and means for limiting the upward movement of said platform comprising a pair of crossed, flexible members attached between said frame members and said platform.

CHARLES H. THETFORD.

REFERENCES CITED

The following references are of record in the file of this patent:

UNITED STATES PATENTS

| Number | Name | Date |
|---|---|---|
| 800,164 | Morford et al. | Sept. 26, 1905 |
| 1,251,238 | Kern | Dec. 25, 1917 |
| 1,382,328 | Stone | June 21, 1921 |
| 1,628,389 | Cochran | May 10, 1927 |
| 1,821,327 | Scott | Sept. 1, 1931 |
| 2,233,111 | Roberts | Feb. 25, 1941 |

FOREIGN PATENTS

| Number | Country | Date |
|---|---|---|
| 334,632 | Great Britain | Sept. 11, 1930 |